No. 623,823. Patented Apr. 25, 1899.
A. N. POE.
FELLY SHIELD.
(Application filed Jan. 3, 1896.)
(No Model.)

Witnesses.
Ed. English
C. N. Johnson

Inventor.
Americus N. Poe.
by Kincaid & Co.
his Attys.

UNITED STATES PATENT OFFICE.

AMERICUS N. POE, OF CALPELLA, CALIFORNIA.

FELLY-SHIELD.

SPECIFICATION forming part of Letters Patent No. 623,823, dated April 25, 1899.

Application filed January 3, 1896. Serial No. 574,244. (No model.)

*To all whom it may concern:*

Be it known that I, AMERICUS N. POE, a citizen of the United States, residing at Calpella, in the county of Mendocino and State of California, have invented certain new and useful Improvements in Felly-Shields; and I do hereby declare the following to be a full, clear, and exact description of the invention, such as will enable others skilled in the art to which it appertains to make and use the same.

This invention relates to improvements in felly-shields; and its object, among others, is to provide a simple, durable, light, and inexpensive device by the use of which the spokes of a wheel can be readily and securely attached to the felly without the necessity of boring into the latter, and thereby weakening it, and, further, to afford a secure means for retaining the metal tire on the felly.

My invention consists in matters hereinafter set forth, reference being had to the accompanying drawings, in which similar letters of reference designate corresponding parts.

Figure 1:
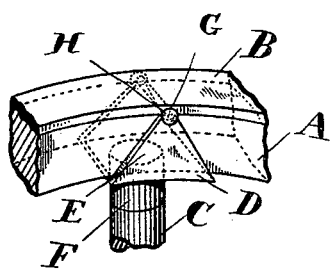
Figure 2:
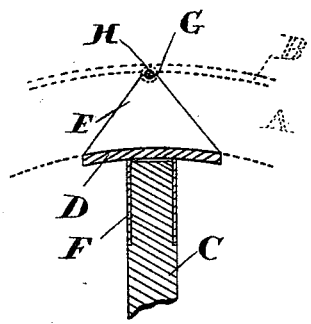
Figure 3:
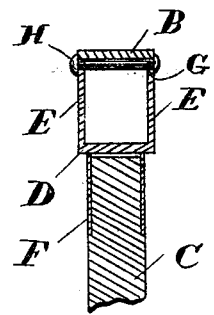

Figure 1 is a perspective view of a portion of the felly of a wheel, showing the manner of connecting it with the spoke. Fig. 2 is a vertical section of my felly-shield attached to a spoke. Fig. 3 is a vertical section of the shield and spoke, taken at right angles to Fig. 2.

I will now explain in detail the construction and function of my invention, reference being had to the above figures.

The device consists of a cylindrical thimble or socket F, one end of which is open to admit the chamfered end of the spoke C, while the other end is closed with plate D, which latter is curved to conform with the curvature of the felly A and terminates in oppositely-disposed triangular side members E E. These side members E E embrace the felly A and extend slightly above the upper edge of the felly, where their vertices are cut out to form a semicircular recess G. A retaining bolt or rivet H is intended to pass through the felly A directly beneath the metal tire B and rest in these depressions or recesses G. The enlarged or spread heads of the bolt H extend over the edge of the tire, thereby preventing any lateral motion thereof.

It is manifest that where the felly is composed of a plurality of segments of bent stuff it is the custom to provide couplings to secure the abutting ends; but by the use of my invention the felly-shield that I have provided answers all the requirements, as the line of joining may be brought between the members E E.

Having thus fully described my invention, its many advantages will, it is thought, be readily understood, and

What I claim, and desire to secure by Letters Patent, is—

In combination with the felly, spokes, and tire of a wheel, of a cylindrical member encircling the outer extremity of said spoke and overlapping opposite sides of said felly, a bolt or rivet resting in a groove in said felly and in an open recess in said overlapping portions and held in said groove and said recess by the direct pressure of said tire substantially as shown and for the purpose set forth.

In witness whereof I hereunto set my hand in presence of two witnesses.

AMERICUS N. POE.

Witnesses:
JAS. A. WHITE,
ED. ENGLISH.